United States Patent [19]

Burkett et al.

[11] Patent Number: 5,296,683
[45] Date of Patent: Mar. 22, 1994

[54] PREHEATING METHOD AND APPARATUS FOR USE IN A FOOD OVEN

[75] Inventors: Doug Burkett; Gary L. Mercer, both of Eaton, Ohio

[73] Assignee: Henny Penny Corporation, Eaton, Ohio

[21] Appl. No.: 746,760

[22] Filed: Aug. 19, 1991

[51] Int. Cl.⁵ .................... H05B 1/02; F27D 11/02
[52] U.S. Cl. .................... 219/497; 219/494; 219/483; 219/411; 219/412
[58] Field of Search .............. 219/490, 494, 497, 506, 219/410, 411, 412, 413, 483, 486

[56] References Cited

U.S. PATENT DOCUMENTS

| | | | |
|---|---|---|---|
| 4,316,068 | 2/1982 | Tanabe | 219/10.55 B |
| 4,358,049 | 8/1985 | Ryckman, Jr. | 219/395 |
| 4,441,015 | 4/1984 | Eichelberger et al. | 219/411 |
| 4,496,827 | 1/1985 | Sturdevant | 219/395 |
| 4,633,065 | 12/1986 | Takazume et al. | 219/396 |
| 4,634,843 | 1/1987 | Payne | 219/486 |
| 4,678,432 | 7/1987 | Teraoka | 432/12 |
| 4,780,597 | 10/1988 | Linhart et al. | 219/396 |

FOREIGN PATENT DOCUMENTS 0202119 4/1987 European Pat. Off. ............ 219/396

Primary Examiner—Mark H. Paschall
Attorney, Agent, or Firm—Baker & Botts

[57] ABSTRACT

A method and apparatus is disclosed for automatically preheating an oven, such as a food oven, based upon its immediate usage history. This preheat function operates by regulating the base heating elements until the temperature of the base plate is within a specified temperature range from the pre-programmed base set point temperature, and then turning quartz lamps on until the air temperature within the oven cavity reaches a certain fixed preheat "exit" temperature. This preheat exit temperature need not be a fixed value, but can be a function of the base set point temperature or the air temperature before or during the preheat operation. In addition, the preheat function can be performed at various times during the oven's operation, and not necessarily only upon power up of the oven.

24 Claims, 3 Drawing Sheets
Microfiche Appendix Included
(4 Microfiche, 224 Pages)

PREHEATING METHOD AND APPARATUS FOR USE IN A FOOD OVEN

REFERENCE TO MICROFICHE APPENDIX

Source code for the process performed by the present invention in a preferred embodiment is contained with this application in 224 frames on 4 microfiche, in the microfiche appendix.

CROSS-REFERENCES TO RELATED APPLICATIONS

This application is related by subject matter to "PROGRAMMABLE LOAD COMPENSATION METHOD AND APPARATUS FOR USE IN A FOOD OVEN", U.S. application Ser. No. 07/746,910 filed Aug. 19, 1991, and to "METHOD AND APPARATUS FOR OPERATING A FOOD OVEN", U.S. application Ser. No. 07/748,200 filed Aug. 19, 1991, both by the same inventors and filed concurrently herewith.

BACKGROUND OF THE INVENTION

1. Field of the Invention

This invention relates generally to the field of food ovens. More specifically, the present invention is directed to a food oven having two heating elements whereby control means are provided for automatically preheating the heating elements before and throughout the operation of the oven to efficiently cook a particular food item.

2. Description of the Prior Art

Today, restaurants find it increasingly more desirable to efficiently cook food in order to provide fast service and to reduce the labor costs involved in the cooking process. Efficiency means that a particular food item is cooked in a short time and with minimal interaction required from an operator while not sacrificing food quality.

Many ovens currently in use contain a single heating element and the user must set the temperature and monitor the food item to determine when to remove it from the oven. Some ovens contain a timer which turns the heating element on and off to allow a food item to cook for a predetermined time.

U.S. Pat. No. 4,238,669 to Huntley, is directed to and entitled, an Oven Having Dual Heating Means. This invention describes an oven having a base plate which is heated. Food items may be placed directly on the heated base plate. A second heating element, preferably a quartz lamp heating element, is placed above the base plate, in the oven's cavity. This quartz heater has a greater thermal intensity than the base heater. A timer is provided which allows the quartz heater to be turned on after a predetermined time, and remain on for a second predetermined time. This would allow, for example, the top of a pizza to be browned quickly after the pizza had almost fully cooked. Thus, the brief time but intense heat from the quartz heater permits a pizza to be rapidly cooked without sacrificing food quality.

When cooking food products in such an oven, a problem arises because of the different heating characteristics of the oven based upon the oven's immediate usage history. For example, when cooking pizzas at the maximum rate allowed by the oven, the pizzas will gradually become more and more "done", which is defined by the amount of browning of the crust bottom and the cheese topping. This is due to the fact that the process of cooking products causes the air cavity to warm up. Therefore, a process and apparatus are needed to automatically preheat the oven to a predetermined state so that subsequent products heated within the oven will undergo a more uniform heating.

SUMMARY OF THE INVENTION

The problems of the prior art are solved by the present invention. The present invention is capable of automatically preheating an oven having dual heating means. Additionally, the present invention provides a means of programming the oven to vary the one time of the quartz heating element depending upon the type of food item to be cooked. Furthermore, the present invention allows the oven to automatically adjust these quartz lamp on times depending upon the current temperature of the oven.

The present invention is directed to a method and apparatus for automatically preheating the oven based upon its immediate usage history. This preheat function operates by regulating the base heating elements until the temperature of the base plate is within a specified temperature range from the pre-programmed base set point temperature, and then turning the quartz lamps on until the air temperature within the oven cavity reaches a certain fixed preheat "exit" temperature. This preheat exit temperature need not be a fixed value, but can be a function of the base set point temperature or the air temperature before or during the preheat operation. In addition, the preheat function can be performed at various times during the oven's operation, and not necessarily only upon power up of the oven.

Specifically, according to a preferred embodiment, the preheat function of the present invention operates by regulating the base heating elements until the programmed setpoint temperature for the selected product to be cooked is reached. During this process, the quartz lamps are off. Thereafter, when the temperature of the base plate in the oven reaches a specified "ready zone" temperature, the quartz lamps are then turned on until the air temperature within the oven cavity reaches a preheat exit temperature. In one embodiment, the ready zone temperature is defined as a base plate temperature within 10° F. of the programmed base plate setpoint temperature. In further embodiments, the preheat exit temperature, rather than being a single fixed value, could be based upon the base plate setpoint temperature. For example, the preheat exit temperature could be calculated to be within a certain offset from the base plate setpoint temperature for the selected product to be cooked.

The above descriptions of the present invention provide only a broad overview of a preferred embodiments within the present invention. The details of certain aspects of the present invention will be more fully understood from the following specification and drawings.

DETAILED DESCRIPTION

The present invention preferably embodies a hardware controller which performs various functions on the oven. The hardware for the controller will first be described, with the functions and steps performed by the hardware described thereafter.

Hardware Description

Figure 1:
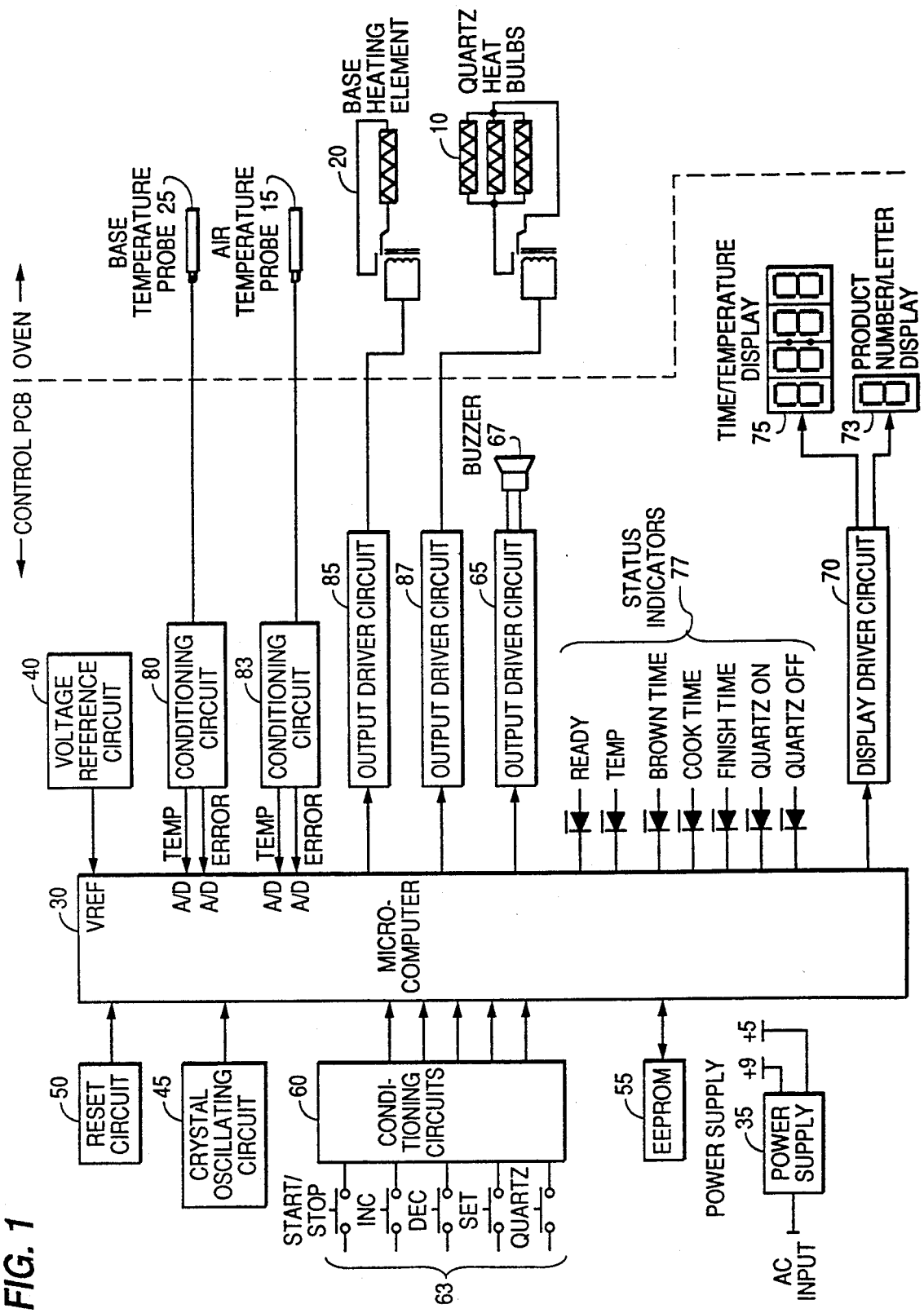
FIG. 1 shows a block diagram of the control hardware for the oven in a preferred embodiment of the present invention.

Referring to FIG. 1, two heating elements 10 and 20 are disposed within an oven having a base and a cavity (not explicitly shown). Base heating element 20 is located preferably underneath a base plate (not explicitly shown), preferably the HTX TRANSITE II TM base by BNZ MATERIALS, INC. However, other base materials such as metal, compressed asbestos, ceramics or other materials on which food may directly be placed and which are able to withstand great temperatures may be used. Base heating element 20 could be a gas heater or other heating means, but preferably is a 3200 watt CALROD electric heating element.

Located within the oven's cavity and above the base plate, preferably near the roof of the cavity, is located the second heating means 10, preferably quartz heat bulbs. The quartz heat bulbs must be able to provide a higher thermal intensity for a substantially brief heating period as opposed to the base heating element 20. Base heating element 20 primarily preferably provides conducting heat whereas quartz heat bulbs tend to preferably provide radiant heat. Both heating means also have appropriate relays or other circuitry to properly switch or toggle them from a first state (on) or a second state (off).

Two temperature probes are provided within the oven to detect temperature within the cavity and base of the oven. Base temperature probe 25 is thus located within or proximate to the base while air temperature probe 15 is located within an air duct immediately outside the oven cavity. Base temperature probe 25 should be placed so as to receive approximately the mean temperature of the base. Similarly, air temperature probe 15 should be placed within the oven cavity, so that it may detect the mean temperature of the air within the oven cavity. Consequently, probes 15 and 25 should not be placed too far, nor too close to heating elements 10 and 20.

Microcomputer 30, which preferably is a Motorola MC68705R3L, provides the computing resources for the hardware, and specifically for the control board. This microcomputer includes a microprocessor and also includes a 4-channel, 8-bit A/D converter which is used to convert the temperature voltage signals from temperature probes 15 and 25 to digital values for computing and control. Microcomputer 30's internal non-volatile memory (ROM or PROM, or preferably EPROM) stores the program code described in detail below. Microcomputer 30 also contains internal random access memory (RAM) which is used for calculation purposes.

Power supply 35, located mainly on the control board in a preferred embodiment, also includes an off-board transformer which converts an AC power input into a proper power supply for the control board and microcomputer 30. Capacitors are provided in power supply 35 to provide EMI/RFI filtering. Additionally, fuses and metal oxide varistors (MOV) are included to provide surge protection. Power supply 35 also preferably includes a diode bridge to fully rectify an AC input voltage into a DC voltage. Additionally, an integrated circuit voltage regulator, as is commonly available in the market, is provided. All of the above elements and construction for power supply 35 are well known in the art.

Reset circuit 50 coupled to microcomputer 30 preferably comprises a capacitor. Crystal oscillator circuit 45 forms the system clock oscillator comprised of preferably a capacitor and a crystal oscillator oscillating at 4 megahertz. This results in an internal clock rate of 1 megahertz. Voltage reference circuit 40 establishes the reference voltages for the internal A/D converter.

EEPROM 55 is a non-volatile memory, preferably located on an integrated circuit capable of serial communications, for example, TS93C46. EEPROM 55 stores the product parameters: times, temperatures, quartz heating settings, and load compensation factors, all of which will be described in more detail below. Appropriate protection circuitry is preferably also connected with EEPROM 55 to insure that the contents of the non-volatile memory are not inadvertently changed during control power-up and powerdown.

Microcomputer 30 also contains appropriate inputs for user inputs located on the exterior of the oven, and outputs for display devices described below. Protection circuitry to insure that noise does not generate false interrupts or corrupts control signal operation is included as is well known to those in the art.

Conditioning circuit 60 provides preferably pull-down resistors which insure that switch input voltages from user input switches 63 do not float when no switch is pressed. Thus, circuit 60 results in preferably an output voltage of approximately 5 volts when a switch is pressed, and approximately 0 volts when no switch is pressed.

LED status indicator 77 is provided to indicate the following states: ready, temperature, brown time, cook time, finish time, quartz lamp on, quartz lamp off. These states will be describe in more detail below. Signals from microcomputer 30 are coupled to status indicators 77, preferably, LEDs, but could be other indication means.

Display driver circuit 70 is preferably an integrated circuit such as MC14489. The display driver circuit 70 preferably is a multiplexing driver circuit to drive time/temperature display 75 and product no./letter display 73. Displays 73 and 75 are preferably seven segment LED displays, but could be other indicating means as are well known in the art. Displays 73 and 75 and indicator 77 are preferably physically located on the control panel on the front panel of the oven. Seven segment display 75 can display both time, numbers and limited alphanumeric messages of up to four characters. Display 73 is used to display the current selected product number from 1 to 9 or a letter from A through F.

Buzzer 67 is preferably a piezoelectric buzzer having a main feedback and ground connection. The buzzer is used to provide audible feedback to the operator of various control operation conditions. Output driver circuit 65 preferably is a modified Hartly oscillator which drives buzzer 67 circuit near its resonant frequency for maximum efficiency in terms of sound pressure level. Output driver circuit 65 preferably includes a switch or means to select a desired setting for the buzzer sound pressure level. Associated driver circuitry is also included in driver circuit 65 as is well known in the art.

Temperature sensor conditioning circuits 80 and 83 are preferably identical signal conditioning circuits connected to base temperature probe 25 and air temperature probe 15, respectively. Conditioning circuits 80 and 83 also preferably include circuitry to determine probe failure in either "open" or "shorted" failure modes and forward signals to microcomputer 30. Thus, two inputs, a temperature and error input, are provided from each conditioning circuit 80 and 83 into the A/D inputs of microcomputer 30. Associated capacitors are provided in conditioning circuits 80 and 83 to provide for EMI and other noise filtering functions, as are well known in the art.

Output driver circuits 85 and 87 are preferably two identical output circuits for driving base heating element 20 and quartz heat bulbs 10, respectively. Driver circuits 85 and 87 preferably include optoisolated triac driver integrated circuits such as MOC3041. Appropriate protection circuitry is provided to prevent false turn-on as is well known in the art. Control signals are provided from microcomputer 30 into driver circuits 85 and 87 to turn on heating elements 20 and 10 at appropriate times, as will be discussed more fully below.

The present invention preferably also includes circuitry to provide for additional heating means in the oven should they be desired to provide even greater flexibility and control as the presently described embodiment. A fan fail circuit may also be provided to detect failure of the off-board cooling fan and thus warn an operator or shut down the system to prevent further damage.

Process Description

The overall operation of the process of the present invention in a preferred embodiment is depicted in the flow diagram of FIG. 2, and will now be described in some detail below. The process executes on microcomputer 30 (shown in FIG. 1) and resides in the internal non-volatile memory of microcomputer 30 (not specifically shown in FIG. 1).

Figure 2:
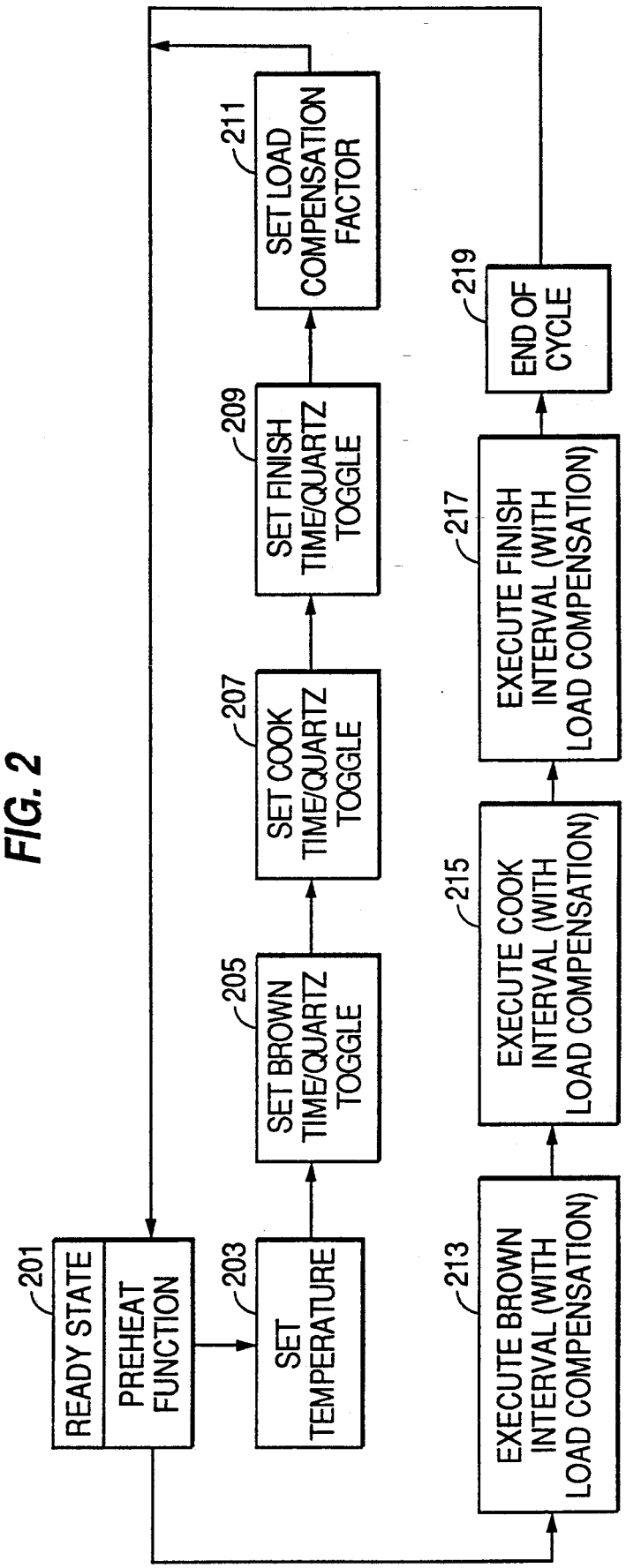
FIG. 2 shows a flow diagram detailing the overall functionality of the present invention in a preferred embodiment.

Referring to FIG. 2, the three aspects of the present invention are shown interacting with one another. Specifically, step 201, the ready state/preheat function is performed when the oven's operation is initially started, and is repeated as needed thereafter. This step generally consists, in part, of heating the base of the oven to a predetermined temperature by means of activating the base heating element 20 and thereafter heating the air in the oven's internal cavity to a predetermined temperature by means of heating element 10.

When a user of the present invention wishes to set the various parameters corresponding to the operation of the oven, he/she may press a "SET" switch (such as the "SET" switch of element 63 of FIG. 1). In a preferred embodiment, the software aspects of the present invention will thereafter prompt the user to enter the various parameters, examples of which are illustrated in steps 203-211. For example, in a preferred embodiment, the user may utilize increment/decrement switches of element 63 to modify the parameters in steps 203-211. In another embodiment, the user may simply directly enter the desired parameters on a device such as a numeric keypad, etc.

Step 203 comprises setting the base temperature setpoint for the oven. This value represents the desired temperature of the base of the oven. This value is used during the preheat function (step 201), as well as the actual oven cooking intervals as described below with respect to steps 213-217.

Steps 205, 207, and 209 comprise selecting the time for the "brown", "cook" and "finish" intervals as well as selectably setting heating element 10 to either be on or off during each interval according to one embodiment of the present invention. The selected values are stored in memory. In a preferred embodiment, the operator may select a time duration between 0–15 minutes for each cooking interval, where the total cooking time is the sum of the selected cooking interval times. After the time for a particular interval is selected, the operator sets heating element 10 to be on or off during that interval. A toggle switch may be provided to set heating element 10. The operator then selects the time for the next interval. However, the order in which the values are selected is not critical. For example, each of the interval times may be selected first, and then the heating element 10 may be set for the individual intervals. In addition, the structure used to select the interval times and to selectably set heating element 10 is not critical. One of skill in the art may recognize a variety of structures to accomplish these functions, including a numeric keyboard with an on/off button, individual buttons, dials, etc.

The selected times and settings are stored within the control system of the present invention, and are thereafter utilized in steps 213-217 to determine the appropriate timing characteristics of the various cooking intervals and the operation of heating element 10. In a preferred embodiment, the first heating element 10 is set on during the brown interval, off during the cook interval, and on during the finish interval.

Step 211 involves setting a load compensation factor. The load compensation factor is utilized to account for the type of load being cooked within the oven. The load compensation factor is used by steps 213-215 in the preferred embodiment to compensate the timing characteristics of the various operating intervals. After the load compensation factor has been set, execution transfers back to the ready state/preheat function until the user requests another operation. The steps performed in utilizing the load compensation factor are described in further detail in copending application entitled "PROGRAMMABLE LOAD COMPENSATION METHOD AND APPARATUS FOR USE IN A FOOD OVEN", Attorney Docket Number 2114.032750, by the same inventor and filed concurrently herewith, which is incorporated herein by reference.

Steps 213, 215, and 217 involve executing the "brown", "cook" and "finish" intervals according to the preferred embodiment of the present invention. These steps are executed after the associated characteristics have been set in steps 203-211, and when the user selects, in a preferred embodiment, the "start" function by pressing the "Start/Stop" key ("START/STOP" switch of element 63 of FIG. 1). Steps 213, 215, and 217 utilize the corresponding temperature, times, load compensation factor, and heating element 10 settings selected in steps 203-211. Specifically, the temperature set in step 203 is maintained throughout these steps, the times for the various intervals are kept in conjunction with the load compensation factor, and the quartz lamp operational status is maintained for each of the three intervals in the preferred embodiment. If the time of a particular interval is set to 0, that interval is skipped. The steps performed in utilizing the various intervals of the present invention are described in further detail in copending application entitled "METHOD AND AP- PARATUS FOR OPERATING A FOOD OVEN", U.S. application Ser. No. 07/748,200, by the same inventor and filed concurrently herewith, which is incorporated herein by reference.

Finally, step 219 corresponds to the end-of-cycle operation performed after the "brown", "cook" and "finish" intervals are completed. After this step has been reached, execution is transferred back to the ready state/preheat function of step 201.

A more detailed description of the preferred embodiment of the present invention follows.

Figure 3:
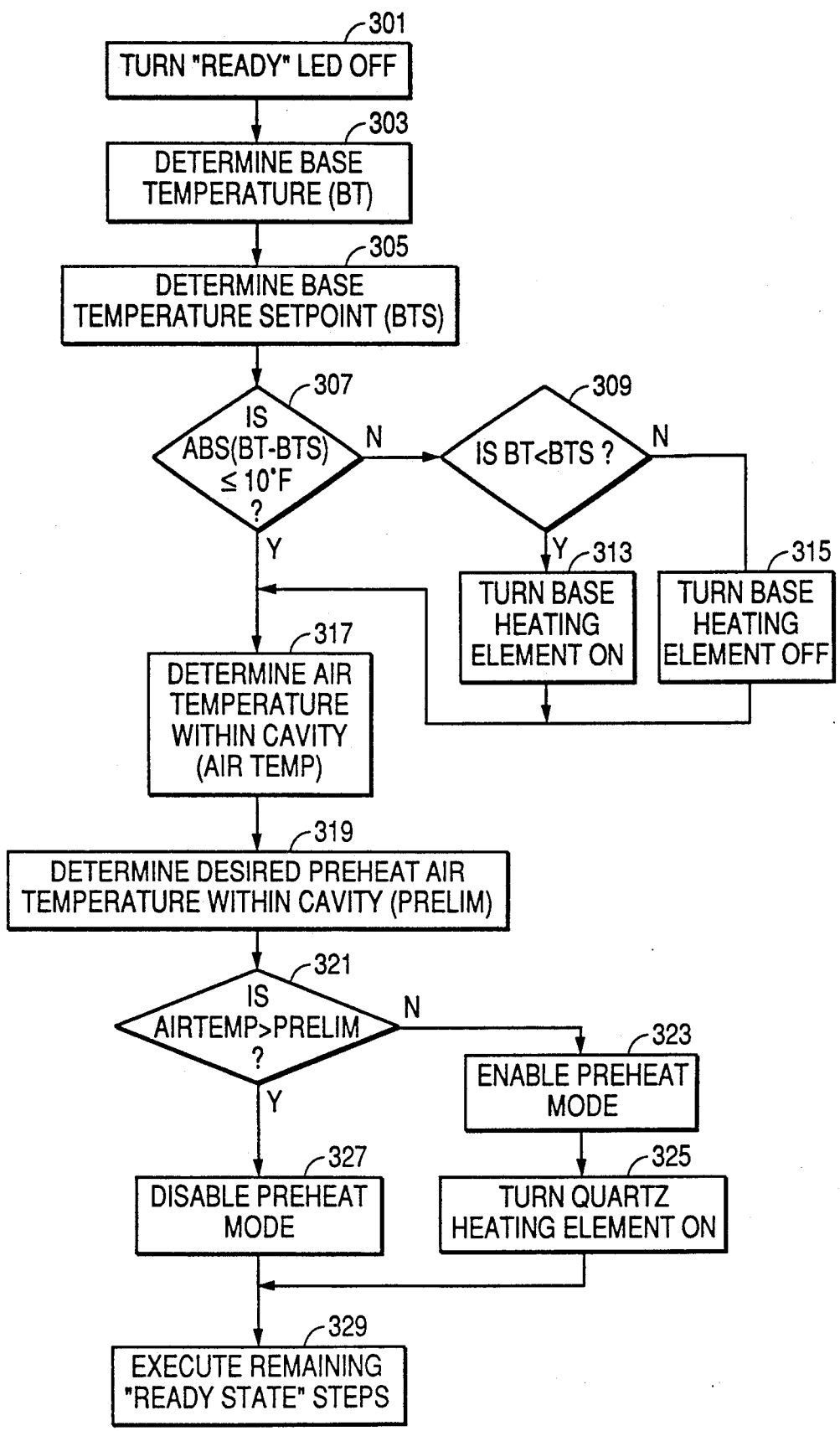
FIG. 3 shows a flow diagram detailing the functionality of the preheat function according to one embodiment of the present invention.

Referring to FIG. 3, the preheat functionality of the present invention is depicted. In a preferred embodiment, the series of steps shown in FIG. 3 are executed repeatedly while the oven is in its "ready state" (e.g., when the oven is not being programmed or being utilized to heat a food product). Thus, the preheat function may be implemented both when the oven is first powered on and many times thereafter, so that it will be ready to be used at any time. However, one of ordinary skill in the art will readily understand that the preheat function of the present invention may be implemented in a variety of ways. For example, the preheat function according to the present invention may also be easily implemented, for example, (1) only once upon the powering up of the oven, (2) at various times during the use of the oven as designated by the user, (3) or in any other timing configuration, while still staying within the scope of the present invention.

Referring back to FIG. 3, the present invention according to a preferred embodiment is shown and will now be described. Starting with step 301, a "ready" light emitting diode (LED) indicator on the oven is first turned off. The "ready" LED is designed to indicate to the user that the oven is ready for normal use after the preheat functionality has been performed. This LED is initially turned off in order to assure that the remaining steps, which possibly modify the state of this LED, will work properly, as will be described below.

Step 303 involves determining the base temperature (BT) of the oven. As previously explained with respect to FIG. 1, microcomputer 30 is able to determine the temperature of the base plate of the oven by utilizing base temperature probe 25 and conditioning circuit 80. In a preferred embodiment, the temperature of the base temperature probe is expressed as A/D bits to microcomputer 30. For example, the temperature may be expressed as an unsigned 8-bit value in the range 0 to 255.

Step 305 consists of determining the base temperature setpoint (BTS) of the oven. This value is previously set by the user of the oven in step 203 of FIG. 2, and may be determined based upon the type of food product to be heated within the oven, or may be determined based upon any other factor. This value may be in any convenient range as determined by the capabilities of the oven and the resolution of the control system. In a preferred embodiment, this value may also be expressed as an unsigned 8-bit value in the range 0 to 255. Thus, step 305 may merely consist of reading the BTS previously stored in a memory location or register.

Step 307 involves performing a simple function on the BT and the BTS, and then making a determination of whether the resulting value is within a certain range. Specifically, the necessary process is performed to subtract the value represented by the BTS from the BT, and then the absolute value of the result is determined. The subtraction operation may be performed using the ordinary instructions available on the microcomputer, while the absolute value operation may be simply performed using standard two's-complement arithmetic.

The resulting value from the above operation is then compared to a temperature value corresponding to the maximum variance from the base temperature setpoint that the actual base temperature may properly be in order to later be in the "ready" state. In a preferred embodiment, the base temperature as measured by the base temperature probe may be within 10° F. from the base temperature setpoint in order to later be in the "ready" state.

Therefore, in a preferred embodiment, if the absolute value of the difference between the BT and the BTS is less than or equal to 10° F., step 317 is encountered. If, on the other hand, the above condition is not satisfied, step 309 is encountered.

Step 309 involves determining whether the BT is less than the BTS. As explained above, if the base temperature (BT) is outside of the specified range (e.g. 10° F.) from the base temperature setpoint (BTS), then that means that the BT may either be less than 10° F. below the BTS or greater than 10° F. above the BTS. In the former case, the base heating elements (element 20 in FIG. 1) need to be activated, while in the latter case, the base elements need to be turned off to allow the base plate to cool down placing it within the 10° F. range.

Thus, step 309 involves determining whether the BT is less than the BTS. If the BT is in fact less than the BTS, the step 313 is encountered which simply consists of turning on (activating) the base heating element. Otherwise, step 315 is encountered which entails turning the base heating element off.

After either steps 307, 313 or 315 are performed, step 317 is next encountered. Step 317 involves determining the air temperature within the oven cavity (AIRTEMP). This step may be accomplished by reading the air temperature probe (element 15 in FIG. 1) through the air temperature conditioning circuit (element 83 in FIG. 1) in a similar fashion to the base temperature probe, which was previously described. As with the base temperature, the AIRTEMP may be expressed as a multi-bit value based upon its A/D conversion.

Step 319 consists of determining the desired preheat air temperature within the oven's cavity (PRELIM). This value may be determined in a variety of ways. For example, it may be (1) a set value, (2) a value varying with the food product being heated, (3) or may be a function of another environmental variable. In a preferred embodiment, the PRELIM is a function of the base temperature setpoint (BTS). Specifically, in a preferred embodiment, the PRELIM is calculated as being 125° F. below the BTS for the selected food product to be heated. Of course, any other suitable offset value may be calculated in a similar manner.

After the AIRTEMP and the PRELIM are determined, step 321 is encountered. Step 321 involves determining whether the AIRTEMP is greater than the PRELIM. This step if performed in order to determine whether the PRELIM temperature has been reached or not. If it has been reached, then step 327 is encountered, and the preheat mode is disabled. Any suitable arrangement of LED indicators, or otherwise, may be used to indicate that this has occurred, and an appropriate register or memory location flag may be set or preset to indicate that this condition exists.

If the AIRTEMP is not greater than the PRELIM, then step 323 is encountered. Step 323 simply consists of enabling the preheat mode. As explained above, a suitable LED indicator, or otherwise, may be used to indicate that the preheat mode is enabled, and an appropriate flag may be set or present to indicate that the preheat mode is enabled.

Next, step 325 is encountered. Step 325 consists of turning on (activating) the quartz heating element (quartz heating bulbs 10 of FIG. 1). By activating the quartz heating elements, the temperature within the oven is increased.

Finally, step 329 is performed, which consists of any other "ready" state functions which may be performed at this time. Such functions may include housekeeping steps, etc.

In a preferred embodiment, steps 301-329 may be performed repeatedly until the appropriate preheat temperatures of the base plate and the air temperature are reached. In this way, the oven is constantly maintained in a state ready to be used to cook food products. Alternatively, steps 301-329 may be modified by one of ordinary skill in the art so that steps 301-315 are executed until the appropriate base temperature (BT) is reached, and thereafter steps 317-329 are executed until the appropriate air temperature within the cavity (AIR-TEMP) is reached. By doing this, steps 301-329 may be performed only once to accomplish the preheat function according to the present invention. One of ordinary skill in the art will appreciate that there are a variety of equivalent ways to implement the present invention while staying within the teachings of this patent.

We claim:

1. In a control system for use with an oven having a cavity in which to heat a load, a thermally conductive heat source beneath a base plate upon which said load is placed, and a high thermal intensity heat source within the cavity, a method of preheating said cavity and said base plate, said preheating method comprising the steps of:
   (a) activating said conductive heat source until the temperature of said base plate reaches a first temperature;
   (b) activating said high thermal intensity heat source until the temperature within said cavity reaches a second temperature; and
   (c) terminating the preheating method when the temperature within said cavity reaches said second temperature.

2. The preheating method according to claim 1, wherein said load comprises food.

3. The preheating method according to claim 1, wherein said load comprises a pizza.

4. The preheating method according to claim 1, wherein said first temperature is within a predetermined temperature offset from a base plate setpoint temperature.

5. The preheating method according to claim 4, wherein said base plate setpoint temperature is determined responsive to thermal characteristics of said load.

6. The preheating method according to claim 4, wherein said first temperature is within 10° F. of said base plate setpoint temperature.

7. The preheating method according to claim 1, wherein said second temperature is within a predetermined temperature offset from a base plate setpoint temperature.

8. The preheating method according to claim 1, wherein said second temperature is within 125° F. of said base plate setpoint temperature.

9. The preheating method according to claim 1, wherein steps (a)-(b) are performed when said oven is initially powered on.

10. The preheating method according to claim 1, wherein steps (a)-(b) are performed subsequent to said oven being initially powered on.

11. The preheating method according to claim 1, wherein steps (a)-(b) are performed repetitively.

12. The preheating method according to claim 1, wherein said oven is a pizza oven.

13. In a control system for use with an oven having a cavity in which to heat a load, a thermally conductive heat source beneath a base plate upon which said load is placed, and a high thermal intensity heat source within the cavity, an apparatus for preheating said cavity and said base plate, said preheating apparatus comprising the following elements:
   (a) means for activating said conductive heat source until the temperature of said base plate reaches a first temperature;
   (b) means for activating said high thermal intensity heat source until the temperature within said cavity reaches a second temperature; and
   (c) means for terminating the preheating method when the temperature within said cavity reaches said second temperature.

14. The preheating apparatus according to claim 13, wherein said load comprises food.

15. The preheating apparatus according to claim 13, wherein said load comprises a pizza.

16. The preheating apparatus according to claim 13, wherein said first temperature is within a predetermined temperature offset from a base plate setpoint temperature.

17. The preheating apparatus according to claim 16, wherein said base plate setpoint temperature is determined responsive to thermal characteristics of said load.

18. The preheating apparatus according to claim 16, wherein said first temperature is within 10° F. of said base plate setpoint temperature.

19. The preheating apparatus according to claim 13, wherein said second temperature is within a predetermined temperature offset from a base plate setpoint temperature.

20. The preheating apparatus according to claim 13, wherein said second temperature is within 125° F. of said base plate setpoint temperature.

21. The preheating apparatus according to claim 13, wherein steps (a)-(b) are performed when said oven is initially powered on.

22. The preheating apparatus according to claim 13, wherein steps (a)-(b) are performed subsequent to said oven being initially powered on.

23. The preheating apparatus according to claim 13, wherein steps (a)-(b) are performed repetitively.

24. The preheating apparatus according to claim 13, wherein said oven is a pizza oven.

* * * * *